United States Patent [19]

Kawamura

[11] Patent Number: 5,076,221

[45] Date of Patent: Dec. 31, 1991

[54] ELECTROMAGNETIC VALVE ACTUATING SYSTEM

[75] Inventor: Hideo Kawamura, Koza, Japan

[73] Assignee: Isuzu Ceramics Research Institute Co., Ltd., Fujisawa, Japan

[21] Appl. No.: 571,526

[22] PCT Filed: Dec. 28, 1989

[86] PCT No.: PCT/JP89/01332

§ 371 Date: Aug. 28, 1990

§ 102(e) Date: Aug. 28, 1990

[87] PCT Pub. No.: WO90/07635

PCT Pub. Date: Jul. 12, 1990

[30] Foreign Application Priority Data

Dec. 28, 1988 [JP]  Japan .............................. 63-334957

[51] Int. Cl.$^5$ .............................................. F01L 9/04
[52] U.S. Cl. ............................ 123/90.11; 251/129.01
[58] Field of Search ............... 123/90.11; 251/129.01, 251/129.05, 129.09

[56] References Cited

U.S. PATENT DOCUMENTS

| | | | |
|---|---|---|---|
| 4,515,343 | 5/1985 | Pischinger | 123/90.11 |
| 4,544,986 | 10/1985 | Buchl | 123/90.11 |
| 4,715,332 | 12/1987 | Kreuter | 123/90.11 |
| 4,777,915 | 10/1988 | Bonvallet | 123/90.11 |
| 4,829,947 | 5/1989 | Lequesne | 123/90.11 |
| 4,841,923 | 6/1989 | Buchl | 123/90.11 |

FOREIGN PATENT DOCUMENTS

| | | | |
|---|---|---|---|
| 43426 | 1/1982 | European Pat. Off. | |
| 0183805 | 10/1983 | Japan | 123/90.11 |
| 0162312 | 9/1984 | Japan | 123/90.11 |

*Primary Examiner*—E. Rollins Cross
*Assistant Examiner*—Weilun Lo
*Attorney, Agent, or Firm*—Staas & Halsey

[57] ABSTRACT

An electromagnetic valve actuating system opens and closes intake and exhaust valves of an engine under electromagnetic forces generated by an electromagnet. A reciprocally movable magnetic pole (6) is coupled to the stem end of an intake/exhaust valve (9). An upper fixed magnetic pole (3a) confronts one end of the movable magnetic pole (6) the direction in which it is reciprocally movable. An intermediate fixed magnetic pole (3b) is disposed in confronting relation to the one end of the movable magnetic pole (6) and the upper fixed magnetic pole (3a). A first fixed magnetic pole (3c) faces the other end of the movable magnetic pole (6). The intake/exhaust valve is opened under a repelling force acting between the upper fixed magnetic pole (3a) and the one end of the movable magnetic pole (6). A second distal fixed magnetic pole (3d) is coupled to the upper fixed magnetic pole (3a) and confronting the other end of the movable magnetic pole (6). An attractive force acts between the upper fixed magnetic pole (3a) and the one end of the movable magnetic pole (6) due to a magnetic flux passing through the second fixed magnetic pole (3d), thereby closing the intake/exhaust valve (9). The timing to open and close the intake/exhaust valve can be varied when the timing to energize the magnetic poles is varied.

11 Claims, 3 Drawing Sheets

ELECTROMAGNETIC VALVE ACTUATING SYSTEM

BACKGROUND OF THE INVENTION

1. Field of the Invention

The present invention relates to an electromagnetic valve actuating system for opening and closing intake and exhaust valves of an engine under electromagnetic forces generated by an electromagnet.

2. Description of the Related Art

Some conventional actuating systems for opening and closing intake and exhaust valves include a single camshaft which has cams to operate the intake and exhaust valves, the camshaft being disposed above or laterally by an engine. The camshaft is connected to the crankshaft of the engine by a belt or the like, so that the camshaft can rotate synchronously with the rotation of the engine.

The valves have stems whose ends are pressed by cam surfaces of the camshaft through a link mechanism such as rocker arms or push rods. The intake and exhaust valves are normally closed by springs, and can be opened when their stem ends are pressed by the cam surfaces.

In an alternative system, an intake camshaft having cams for acting on intake valves and an exhaust camshaft having cams for acting on exhaust valves are disposed above an engine. The intake and exhaust valves are opened when the stem ends of the intake valves are directly pushed by the cam surfaces of the intake camshaft and the stem ends of the exhaust valves are directly pushed by the cam surfaces of the exhaust camshaft.

However, the above conventional actuating systems for opening and closing intake and exhaust valves have several disadvantages. First, the conventional systems include camshafts and link mechanisms added to the engine, which necessarily renders the engine large in size.

Secondly, since the camshafts and the link mechanisms are driven by the output shaft of the engine, the engine output power is partly consumed due to the frictional resistance produced when the camshafts and the link mechanisms are driven by the engine. As a result, the effective engine output power is reduced.

Finally, the timing with which the intake and exhaust valves are opened and closed cannot be altered during operation of the engine, but the valve opening and closing timing is preset such that the engine operates with high efficiency only when it rotates at a predetermined speed. Therefore, the engine output power and efficiency are lower when the engine rotates at a speed different from the predetermined speed.

To solve the above problems, there have been proposed valve actuating systems for opening and closing intake and exhaust valves under electromagnetic forces from electromagnets, rather than with camshafts, as disclosed in Japanese Laid-Open Patent Publications Nos. 58-183805 and 61-76713.

However, the coils of the electromagnets disclosed in the above publications must be supplied with large electric energy in order to generate electromagnetic forces to actuate the intake and exhaust valves. As a result the coils radiate a large amount of heat. As the electromagnets are associated with a cooling unit having a considerable cooling capacity, the problem of the large engine size still remains unsolved.

SUMMARY OF THE INVENTION

In view of the aforesaid problems, it is an object of the present invention to provide an electromagnetic valve actuating system for opening and closing intake and exhaust valves of an engine under electromagnetic forces from an electromagnet, rather than with a camshaft, the electromagnet being high in efficiency and output.

According to the present invention, there is provided an electromagnetic valve actuating system comprising a movable magnetic pole coupled to an intake/exhaust valve. The movable magnetic pole is reciprocally movable. The system has a fixed magnetic pole confronting one end of the movable magnetic pole, an intermediate fixed magnetic pole confronting the upper fixed magnetic pole, and a first distal (lower) fixed magnetic pole confronting the other end of the movable magnetic pole. A first electromagnet is provided having a first coil for generating a magnetic flux passing through the upper fixed magnetic pole, and a second coil for generating a magnetic flux passing through the first distal fixed magnetic pole. A second distal fixed magnetic pole confronts a side of the movable magnetic pole. A second electromagnet is provided having a third coil for generating a magnetic flux passing through the second distal fixed magnetic pole. The upper fixed magnetic pole, the first distal fixed magnetic pole, the first electromagnet, the second distal fixed magnetic pole, and the second electromagnet are arranged around the movable magnetic pole alternately along the direction in which the movable magnetic pole is movable.

The valve is opened by energization of the first electromagnet and closed by energization of the second electromagnet. Therefore, electromagnetic forces acting on the valve are strong, and the valve actuating system is rendered light in weight and small in size.

DESCRIPTION OF THE PREFERRED EMBODIMENT

An embodiment of the present invention will hereinafter be described in detail with reference to the drawings.

Figure 1B:
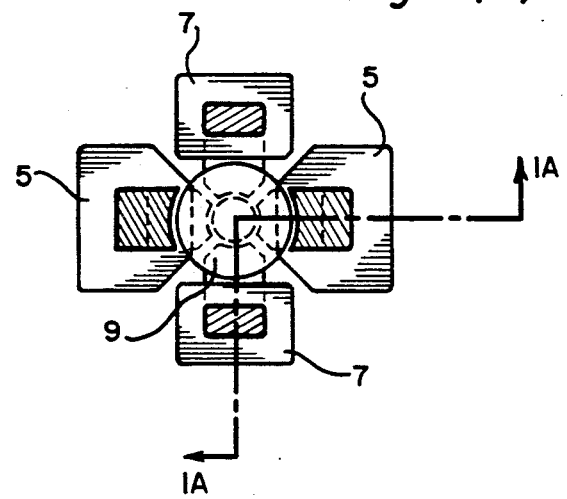
FIG. 1a and 1b are block diagrams showing an electromagnetic valve actuating system according to an embodiment of the present invention.
Figure 1A:
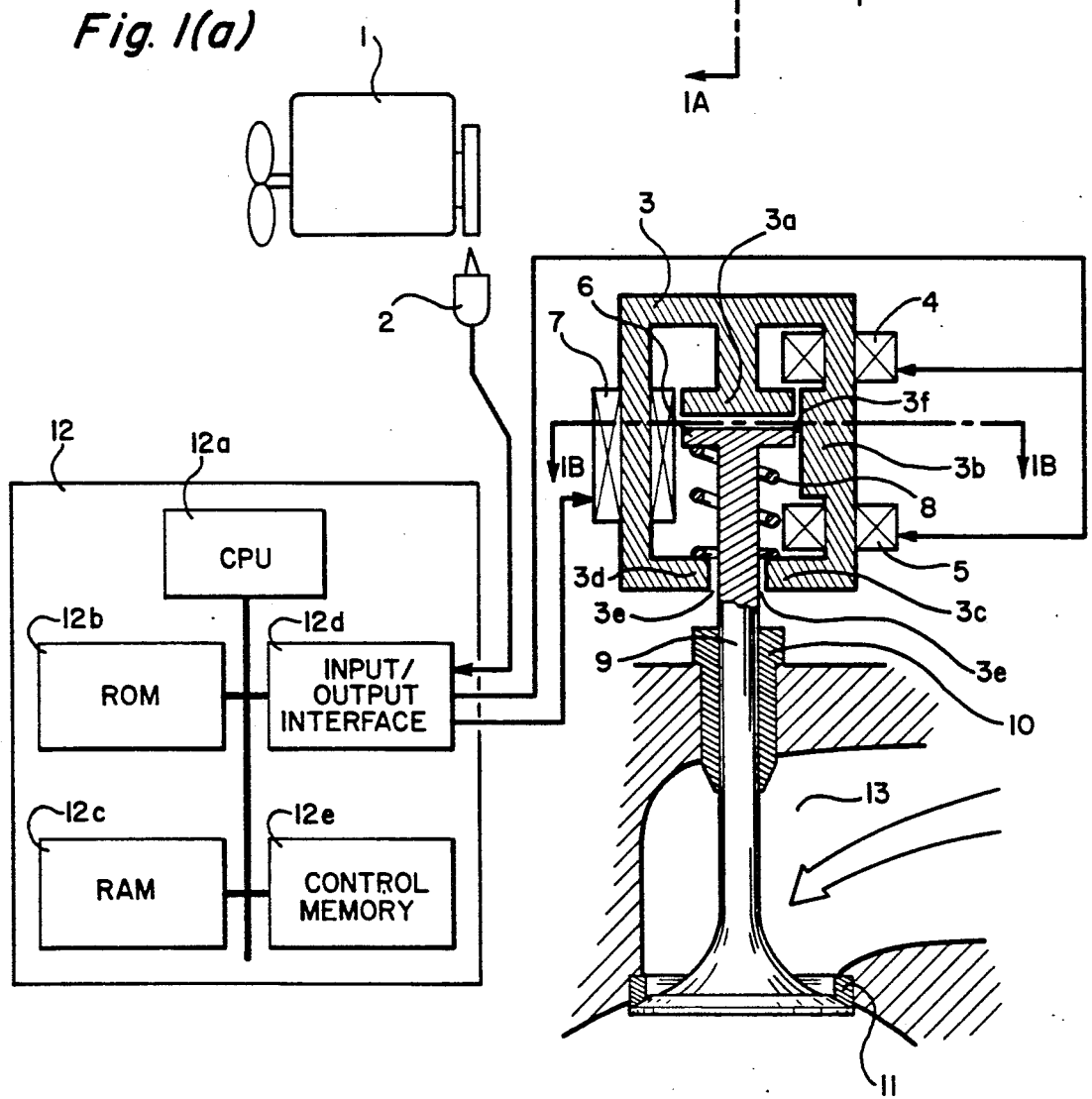

FIG. 1 is a block diagram showing an actuating system according to an embodiment of the present invention.

An engine 1 has an output shaft, adjacent to which there is disposed a rotation sensor 2 for detecting the rotational speed and phase of the output shaft and converting the detected speed and phase into a signal. The engine 1 has intake and exhaust ports which are opened and closed by intake and exhaust valves, respectively. Of these intake and exhaust valves, the intake valve will mainly be described below.

An intake valve 9 is made of a magnetic material. The intake valve 9 has a stem axially slidably supported by a valve guide 10.

A valve seat 11 is mounted in the intake port of an intake passage 13. The intake port is closed when the head of the intake valve 9 is closely held against the valve seat 11. The stem of the intake valve 9 has a flange 6 on its end, the flange 6 being made of a magnetic material.

Between the flange 6 and the valve guide 10, there is disposed a spring 8 for preventing the intake valve 9 from dropping into the engine cylinder when the engine is not in operation. The stem end of the intake valve 9 is surrounded by an electromagnet 3.

The electromagnet 3 has an upper fixed magnetic pole 3a positioned therein and facing the end face of the stem end of the intake valve 9, and an intermediate fixed magnetic pole 3b extending around and facing the upper fixed magnetic pole 3a and the outer circumferential surface of the flange 6.

The electromagnet 3 also has a first distal (lower) fixed magnetic pole 3c disposed in an opening thereof and confronting the stem side of the intake valve 9. A first coil 4 is disposed in the electromagnet 3 between the upper fixed magnetic pole 3a and the intermediate fixed magnetic pole 3b, and a second coil 5 is disposed in the electromagnet 3 between the intermediate fixed magnetic pole 3b and the first distal fixed magnetic pole 3c.

The electromagnet 3 further has a second distal (lower) fixed magnetic pole 3d confronting the stem side of the intake valve 9. The electromagnet 3 also has a path of magnetic lines of force extending from the upper fixed magnetic pole 3a to the second distal fixed magnetic pole 3d. A third coil 7 is disposed between the upper fixed magnetic pole 3a and the second distal fixed magnetic pole 3d. The first and second coils 4, 5 and the third coil 7 are alternately arranged along the stem of the intake valve 9.

The intermediate fixed magnetic pole 3b and the stem end of the intake valve 9 are held out of contact with each other by only a small gap 3f defined therebetween. The first distal fixed magnetic pole 3c and the second distal fixed magnetic pole 3d, and the stem end of the intake valve 9 are also held out of contact with each other by only a small gap 3e defined therebetween.

The control unit 12 includes, an input/output interface 12d which transmits output signals and receives an input signal. The control unit 12 is connected to the rotation sensor 2, the coil 4, the second coil 5, and the third coil 7 by the input/output interface 12d. The control unit also has a ROM 12b for storing a program and data, a CPU 12a for effecting arithmetic operations under the control of the program stored in the ROM 12b, a RAM 12c for temporarily storing the input signals and the results of arithmetic operations, and a control memory 12e for controlling the flow of signals in the control unit 12.

Operation of the electromagnetic valve actuating system according to the present invention will be described below.

Figure 2A:
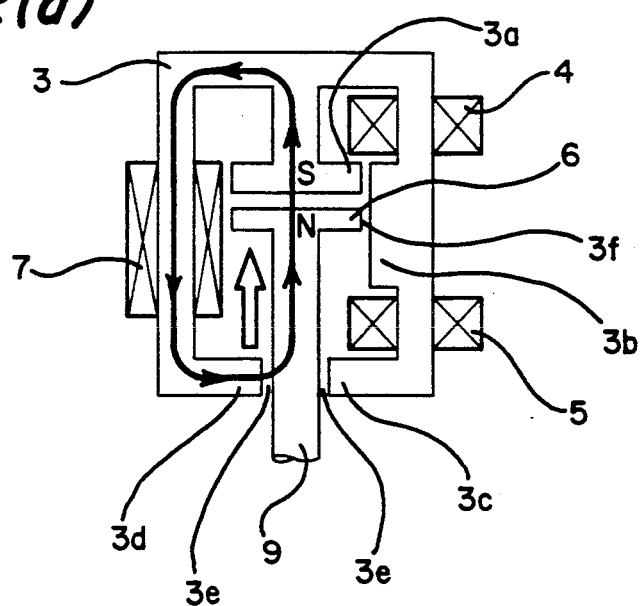
FIGS. 2(a) through 2(c) are diagrams showing the flow of magnetic lines of force within an electromagnet.
Figure 2B:
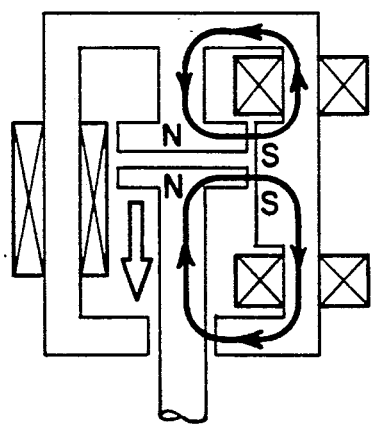
Figure 2C:
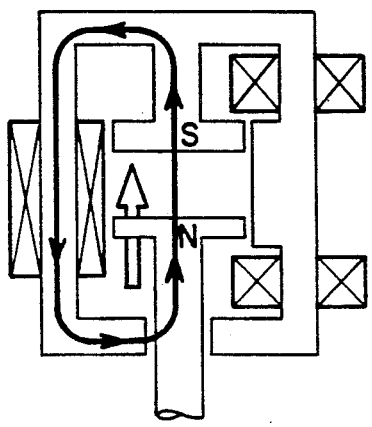

FIGS. 2(a) through 2(c) show the flow of magnetic lines of force in the electromagnet 3. FIG. 2(a) shows the flow of magnetic lines of force when the valve is to be closed, FIG. 2(b) shows the flow of magnetic lines of force when the valve starts being opened from the closed condition, and FIG. 2(c) shows the flow of magnetic lines of force when the valve starts to move in a closing direction after its movement in the opening direction has been decelerated.

In FIG. 2(a), DC electric energy is supplied to only the third coil 7. Magnetic lines of force generated by the third coil 7 pass through a magnetic path which extends from the upper fixed magnetic pole 3a through the inside of the electromagnet 3 to the second distal fixed magnetic pole 3d, and then from the second distal fixed magnetic pole 3d through the gap 3e to the stem end of the intake valve 9 and then back to the upper fixed magnetic pole 3a.

When the magnetic lines of force flow as described above, an S(South) pole is created on the upper fixed magnetic pole 3a, and an N (North) pole is created on the flange 6 at the stem end of the intake valve 9 which confronts the upper fixed magnetic pole 3a. Therefore, the upper fixed magnetic pole 3a and the flange 6 are attracted to each other.

Immediately before the upper fixed magnetic pole 3a and the flange 6 contact each other, the head of the intake valve 9 is closely held against the valve seat 11, thereby closing the intake port.

As shown in FIG. 2(b), when the rotational phase of the engine 1 as detected by the rotation sensor 2 reaches the timing to open the intake valve 9, the third coil 7 is de-energized, and the first coil 4 and the second coil 5 are energized such that the magnetic lines of force generated by these coils rotate in the opposite directions to each other. Specifically, the magnetic lines of force generated by the first coil 4 flow through a magnetic path which extends from the upper fixed magnetic pole 3a to the intermediate fixed magnetic pole 3b, and then back to the upper fixed magnetic pole 3a. The magnetic lines of force generated by the second coil 7 flow through a magnetic path that extends from the first distal fixed magnetic pole 3c through the gap 3e to the flange 6 of the intake valve 9, and then through the gap 3f and the intermediate fixed magnetic pole 3b back to the first distal fixed magnetic pole 3c.

With the magnetic paths thus produced N poles are created on both the flange 6 and the upper fixed magnetic pole 3a. Thus, the upper fixed magnetic pole 3a and the flange 6 are repelled from each other. Accordingly, the intake valve 9 is repelled downwardly, starting to move in the opening direction.

As illustrated in FIG. 2(c), the first and second coils 4, 5 are de-energized and the third coil 7 is energized again upon elapse of a first preset time after the intake valve 9 has started moving in the opening direction. As with the condition shown in FIG. 2(a), the intake valve 9 is subjected to an attractive force in the upward direction, i.e., in the closing direction. The attractive force serves to decelerate the intake valve 9 which is moving in the opening direction, and finally stop the intake valve 9. The position in which the intake valve 9 is stopped corresponds to a position in which it has traversed the maximum stroke.

After the intake valve 9 is stopped, the third coil 7 is continuously energized to start moving the intake valve 9 in the upward direction, i.e., in the opening direction.

Upon elapse of a second preset time which is longer than the first preset time, the third coil 7 is de-energized again, and the first and second coils 4, 5 are energized, applying a downward force to the intake valve 9. This is to decelerate the intake valve 9 as it moves in the closing direction, thereby lessening shocks imposed when the head of the intake valve 9 is seated on the valve seat 11.

Upon elapse of a third preset time which is longer than the second preset time, the first and second coils 4, 5 are de-energized, and the third coil 7 is energized again, so that the magnetic path shown in FIG. 2(a) is formed, imposing an upward force on the intake valve 9.

The first, second, and third preset times are determined as follows: A table of preset times and engine rotational speeds is stored in advance in the ROM 12b, and a preset time corresponding to a certain engine rotational speed is determined from the table based on the engine rotational speed.

The opening and closing condition of the valve will be described with reference to FIG. 3.

Figure 3:
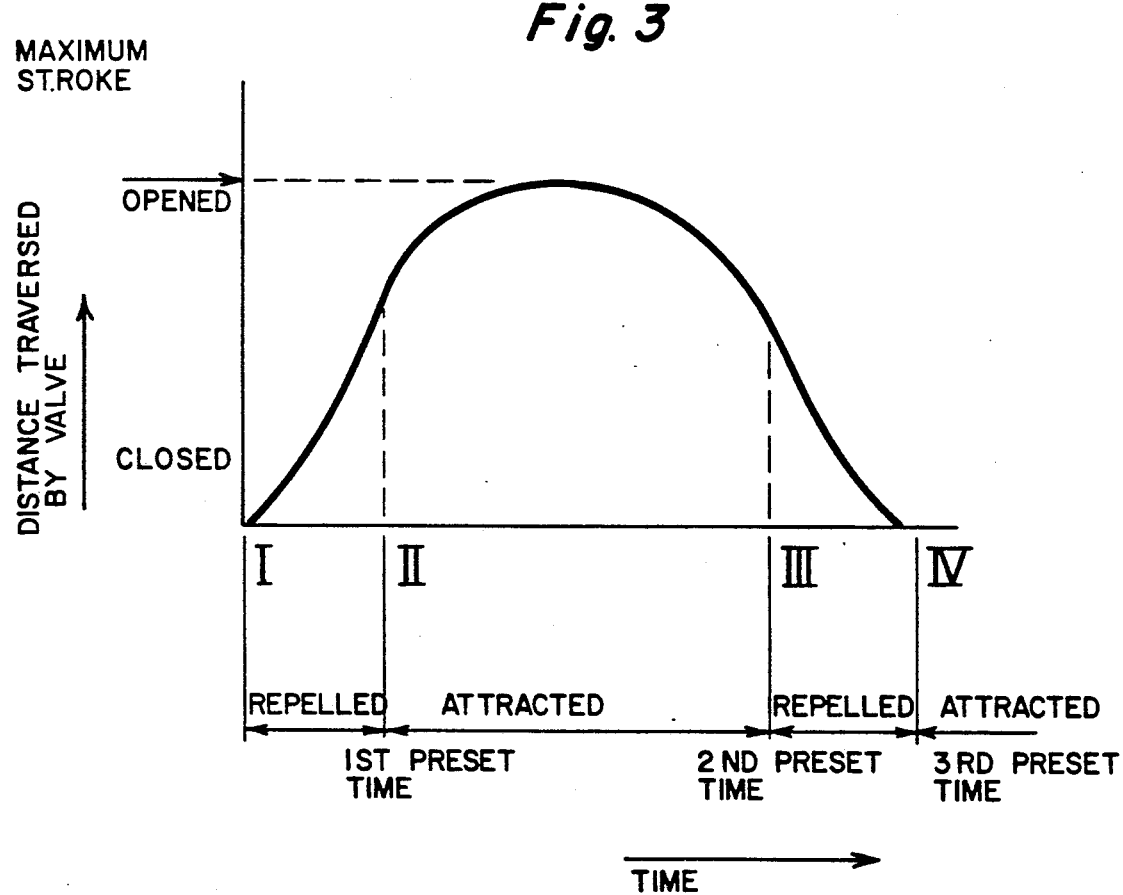
FIG. 3 is a diagram showing the relationship between the distance which the valve moves and time.

FIG. 3 shows a cam profile curve. The horizontal axis of the graph indicates the time from the opening timing of the intake valve 9, and the vertical axis indicates the distance by which the intake valve 9 moves. The curve in FIG. 3 shows the change time, in the distance by which the intake valve moves.

At a time I which is the valve opening timing, the third coil 7 is de-energized, and the first and second coils 4, 5 are energized to switch the flow of magnetic lines of force from the condition shown in FIG. 2(a) to the condition shown in FIG. 2(b). The intake valve 9 is now subjected to a repelling force in the opening direction, and starts moving in the opening direction.

At a time II when the first preset time elapses, the first and second coils 4, 5 are de-energized, and the third coil 7 is energized to switch the flow of magnetic lines of force from the condition shown in FIG. 2(b) to the condition shown in FIG. 2(c). An attractive force in the closing direction now acts on the intake valve 9, decelerating the intake valve 9 as it moves in the opening direction. After the intake valve 9 has reached the maximum stroke position, the intake valve 9 reverses its movement for the closed-position.

At a time III when the second preset time elapses, an attractive force in the opening direction is applied again to the intake valve 9, decelerating the intake valve 9 as it moves in the closing direction.

At a time IV when the third preset time elapses, the magnetic lines of force are brought into the condition shown in FIG. 2(a). The intake valve 9 remains closed until next opening timing.

When the operation of the engine 1 is finished, the third coil 7 is de-energized, and any electromagnetic forces for holding the intake valve 9 closed are eliminated. Therefore, the intake valve 9 is maintained in the closing condition by the spring 8. The holding force of the spring 8 is sufficiently small with respect to the repelling force generated by the first and second coils 4, 5 to open the intake valve 9.

The ROM 12 may store, in addition to the table of preset times and engine rotational speeds, a map of engine rotational speeds and valve opening timing values. By varying the valve opening timing depending on the engine rotational speed using the map, the engine output and efficiency can be increased in a full range of engine rotational speeds.

Furthermore, an engine cylinder control process for increasing or reducing the number of engine cylinders that are in operation can be carried out by actuating or disabling the intake and exhaust valves associated with the engine cylinders depending on the rotational speed of the engine 1.

The magnetically interrupted portions of the magnetic path in the electromagnet 3, i.e., the gap 3f between the flange 6 and the intermediate fixed magnetic pole 3b and the gap 3e between the stem end of the intake valve 9, and the first and second distal fixed magnetic poles 3c, 3d, are small irrespective of whether the valve is opened or closed, and hence any leakage of magnetic lines of force from the magnetic path is small. Accordingly, the electromagnetic forces generated by the electromagnet 3 is strong. As a result, the efficiency with which the electromagnetic forces are generated is increased, and the electric energy supplied to the electromagnet is reduced, resulting in a reduction in the amount of heat generated by the electromagnet 3.

While the intake valve has been described above, the actuating system of the present invention is also applicable to the exhaust valve, which is omitted from illustration.

Although a certain preferred embodiment has been shown and described, it should be understood that the present invention should not be limited to the illustrated embodiment but many changes and modifications may be made therein without departing from the scope of the appended claims.

As described above, the electromagnetic valve actuating system according to the present invention can be used as a system for actuating intake and exhaust valves of an engine, and suitable for use with an engine which is required to vary the timing to open and close the intake and exhaust valves freely.

I claim:

1. An electromagnetic valve actuating system for opening and closing a valve such as an intake and exhaust valve in an engine, comprising:
    a movable magnetic pole having a first end and second end coupled to the valve, said movable magnetic pole being mounted for reciprocating movement;
    an upper fixed magnetic pole confronting the first end of said movable magnetic pole;
    an intermediate fixed magnetic pole coupled to said upper fixed magnetic pole and confronting said upper fixed magnetic pole and the first end of said movable magnetic pole;
    a first distal fixed magnetic pole coupled to said intermediate fixed magnetic pole and confronting the second end of said movable magnetic pole;
    a second distal fixed magnetic pole coupled to said upper fixed magnetic pole and confronting the second end of said movable magnetic pole;
    a first coil for generating a magnetic flux passing through said upper fixed magnetic pole;
    a second coil for generating a magnetic flux passing through said first distal fixed magnetic pole;
    a third coil for generating a magnetic flux passing through said second distal fixed magnetic pole; and
    energization control means for energizing said first, second, and third coils to open and close said valve.

2. An electromagnetic valve actuating system according to claim (1), wherein said valve is made of a magnetic material.

3. An electromagnetic valve actuating system according to claim (1), wherein said energization control means applies a repelling force acting between said upper fixed magnetic pole and the one end of said movable magnetic pole before said valve is seated, thereby lessening shocks produced when the valve is seated.

4. An electromagnetic valve actuating system according to claim (1), wherein the timing established by said energization control means to open and close the valve is variable as the rotational speed of the engine varies.

5. A valve control system in an engine, comprising:
an electromagnet having coils and having an upper, intermediate and first and second lower magnetic poles;
a valve, having a movable magnetic pole confronting the upper, intermediate and first and second lower magnetic poles; and
control means for controlling movement of said valve by energizing and deenergizing the coils of said electromagnet at timings corresponding to a speed of the engine.

6. A valve control system according to claim 5, wherein the coils in the electromagnet include a first, second and third coil and wherein said control means opens said valve by energizing the first and second coils and closes said valve by energizing the third coil.

7. A valve control system according to claim 6, further comprising speed detection means for detecting the speed of the engine, and
said control means comprising a control unit including an input/output interface connected to said electromagnets and said speed detection means, a storage means for storing a table of the timings corresponding to different speeds of the engine, and the processor calculating the timings based on the speed detected by said detection means.

8. A method of controlling a valve with an electromagnet in an engine, comprising the steps of:
(a) detecting a speed of the engine;
(b) reading the speed of the engine into a computer; and
(c) opening said valve by energizing first and second coils in the electromagnet to create a magnetic line of force from an upper magnetic pole to an intermediate magnetic pole and then back to the upper magnetic pole and from first lower magnetic pole through said valve to the intermediate magnetic pole and back to the first lower magnetic pole; and
(d) closing said valve by deenergizing the first and second coils and energizing the third coil to create a magnetic line of force from the upper magnetic pole through said electromagnetic to a second lower magnetic pole, to said valve and then back to the upper magnetic pole.

9. A method for controlling a valve according to claim 8, wherein said energizing and deenergizing in steps (c) and (d) is performed at timings read by the computer from a preset speed/timing table based on the speed of the engine.

10. A method according to claim 8, further comprising the steps of:
(e) decelerating the valve before it is closed by performing step (c); and
(f) finally closing said valve by performing step (d).

11. A method according to claim 10, wherein steps (a) through (f) are repeated with each full piston stroke of the engine.

* * * * *